United States Patent [19]

Ferguson et al.

[11] Patent Number: 4,702,034
[45] Date of Patent: Oct. 27, 1987

[54] EDGING ASSEMBLY

[75] Inventors: Brian D. Ferguson, Kenmore; Phillip B. Jackson, River Hills, both of Australia

[73] Assignee: Aqua-Edge Industries Australia Pty. Ltd, Queensland, Australia

[21] Appl. No.: 866,153

[22] Filed: May 22, 1986

Related U.S. Application Data

[63] Continuation-in-part of Ser. No. 623,970, Jun. 25, 1984, abandoned.

[51] Int. Cl.⁴ ................................................ A01G 1/00
[52] U.S. Cl. ........................................ 47/33; 239/276
[58] Field of Search ............... 239/276, 279, 280, 273, 239/285, 289, 201, 202, 207, 266, 268, 269, 547; 256/13.1, 11, 12, 24, 25, DIG. 5, DIG. 4, DIG. 6; 43/132.1; 47/33, 26, 27, 28, 46, 48.5

[56] References Cited

U.S. PATENT DOCUMENTS

| | | | |
|---|---|---|---|
| 414,346 | 11/1889 | Wainwright | 239/276 X |
| 648,263 | 4/1900 | Hall | 239/269 X |
| 2,746,799 | 5/1956 | Nelson | 239/279 |
| 2,750,232 | 6/1956 | Szantay et al. | 239/279 X |
| 3,361,363 | 1/1968 | Babington | 239/266 X |
| 3,425,630 | 2/1969 | Fessler | 47/46 X |
| 3,586,239 | 6/1971 | Blass | 239/276 |
| 3,633,826 | 1/1972 | Baker | 239/276 X |
| 3,701,477 | 10/1972 | Matt | 47/33 X |
| 3,865,309 | 2/1975 | Greenhalgh | 47/33 X |
| 4,135,668 | 1/1979 | Winkler et al. | 239/276 |
| 4,496,264 | 1/1985 | Casey | 256/13.1 X |

FOREIGN PATENT DOCUMENTS

| | | | |
|---|---|---|---|
| 127349 | 4/1948 | Australia | 239/269 |
| 922745 | 12/1954 | Fed. Rep. of Germany | 239/279 |
| 1422293 | 11/1965 | France | 47/33 |
| 15425 | 11/1986 | Italy | 47/33 |

*Primary Examiner*—James R. Feyrer
*Assistant Examiner*—Danton DeMille
*Attorney, Agent, or Firm*—Christie, Parker & Hale

[57] ABSTRACT

This invention relates to an edging assembly which may be used for bordering a lawn, garden strip, patio and the like.

The edging assembly includes a plurality of elongate supports adapted to be driven in or otherwise retained by a substrate or base surface.

There is also provided a continuous integral cover strip formed from flexible material having a pair of downwardly extending side flanges and a top conduit with a plurality of spaced water outlets.

There is also provided releasable attachment means preferably utilizing a plug-socket interengagement between the each elongate support and the continuous integral cover strip. The arrangement is such that the edging assembly may be installed in the ground by initially embedding the elongate supports at spaced intervals within the ground and subsequently attaching the cover strip to the elongate supports through the agency of the releasable attachment means where the cover strip is supported in a fixed orientation by bearing contact with the plurality of elongate supports.

5 Claims, 13 Drawing Figures

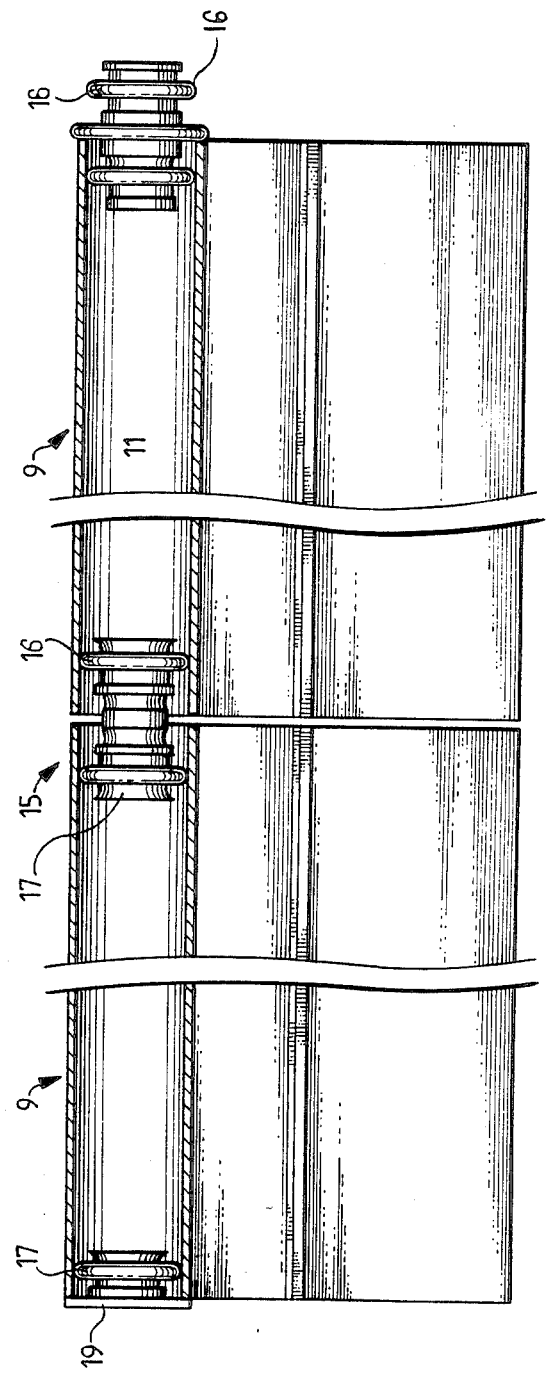

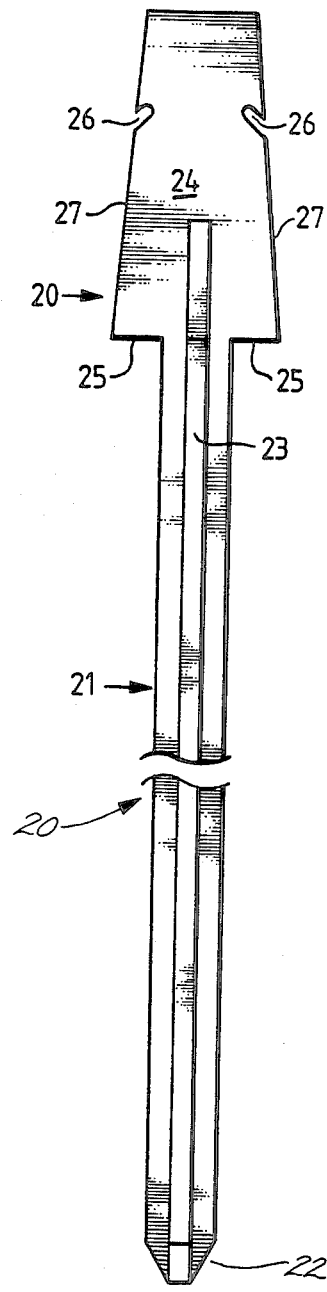
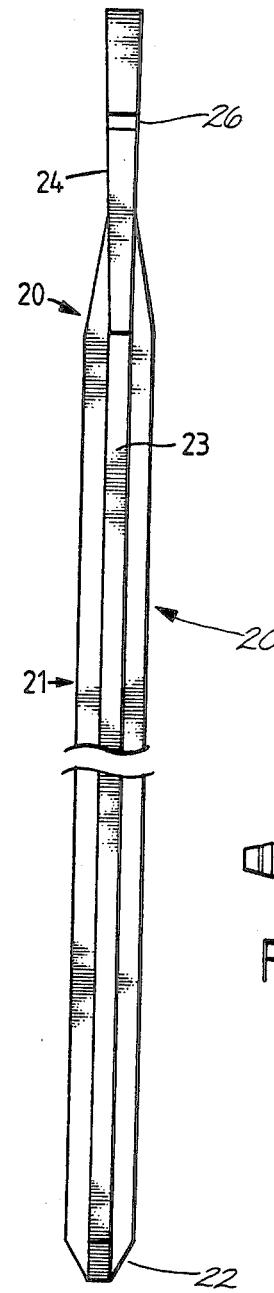
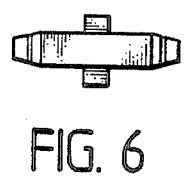
FIG. 4　　FIG. 5
FIG. 6

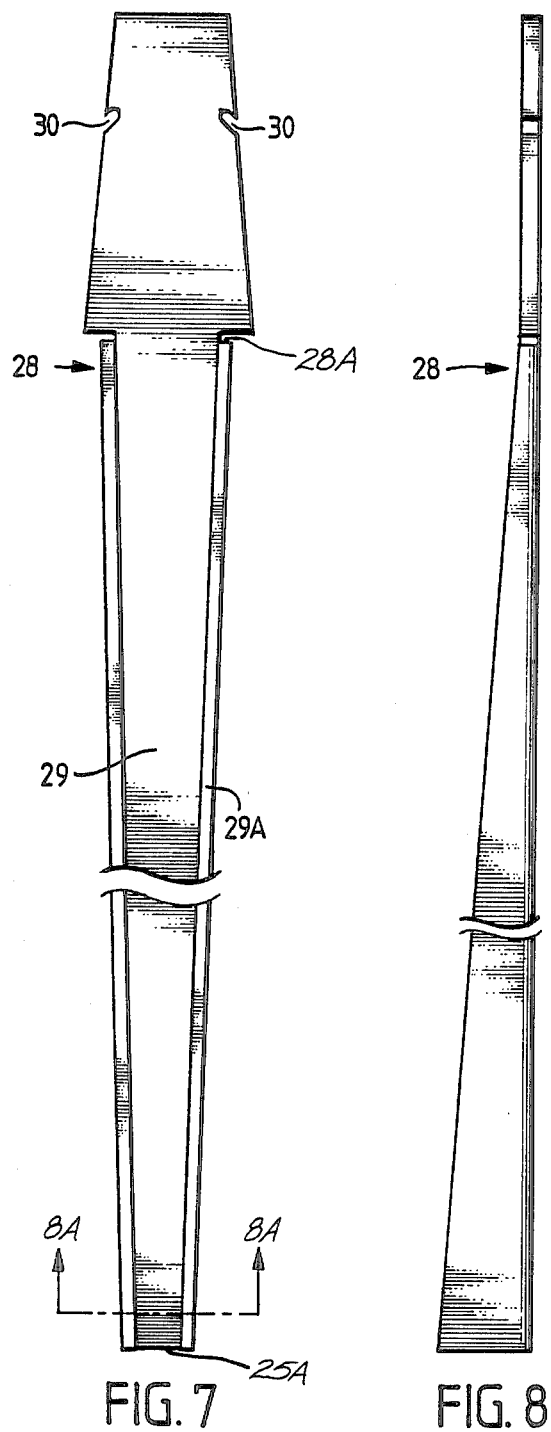

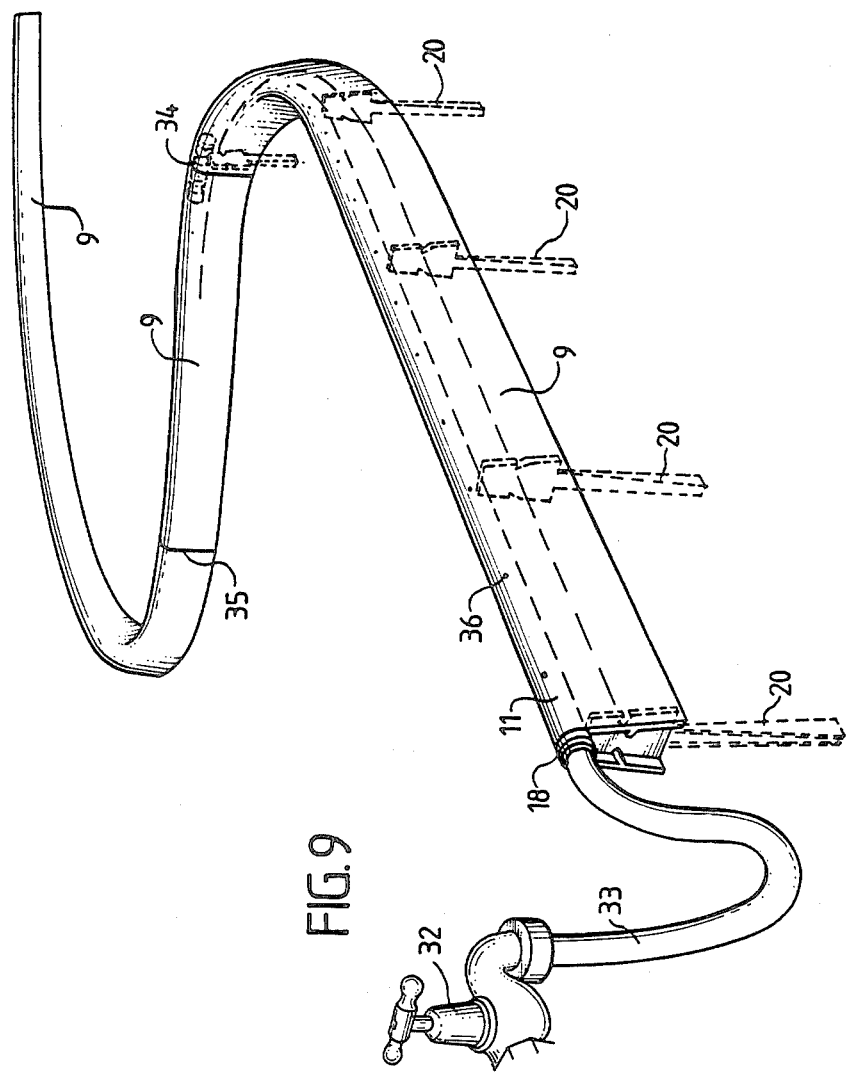

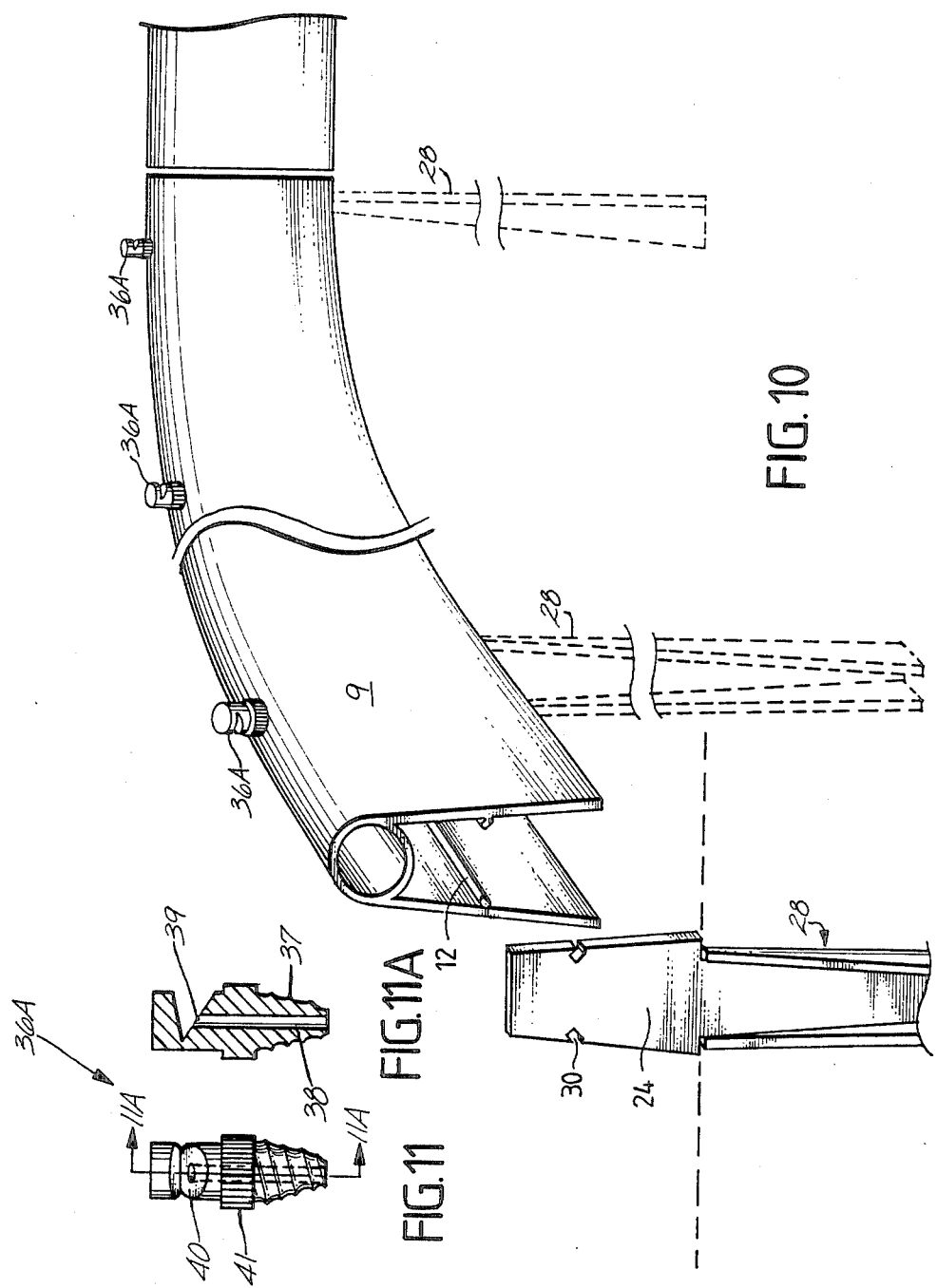

EDGING ASSEMBLY

CROSS-REFERENCE TO RELATED APPLICATIONS

This application is a continuation-in-part of Ser. No. 623,970, filed June 25, 1984, now abandoned.

BACKGROUND OF THE INVENTION

1. Field of the Invention

This invention relates to an improved edging assembly which may be used for bordering a lawn, garden strip, patio and the like.

2. Description of Related Art

An edging assembly of this type is disclosed in Australian Patent specification No. 13039/66. There is described in that document an edging assembly comprising a plurality of metal stakes of I or channel section which were each driven into the ground. A cover of inverted channel section was then mounted to the plurality of stakes to conceal the respective upper portions of the stakes above ground level. The cover was formed from generally rigid material. There was also provided a conduit supported by the upper ends of the stakes and covered by the top part of the channel shaped cover which was provided with perforations or holes which were fitted with jets or nozzles, thereby providing a sprinkler system for plants or grass located adjacent to the edging assembly. There was also disclosed the fact that there could be provided a concrete strip located adjacent to the channel shaped cover or continuous side flange of the channel shaped cover which provided a firm surface for supporting a lawnmower wheel and thereby allowing a grass plot to be cut right to the peripheral edge thereof.

It has been found in practice that an edging assembly as described above was not commercially accepted. This was mainly due to the method of construction or installation wherein it was necessary for a portion of the channel-shaped cover, in most cases to be buried in the ground and for the channel portion to be fitted snugly over the plurality of metal stakes. It was also necessary to make provision for the conduit to be located within the interior of the channel shaped cover. Thus, installation or construction of the edging assembly was time consuming and labor intensive. Also the above-mentioned arrangement was cumbersome and unduly complicated in construction.

U.S. Pat. No. 3,485,449 relates to a grass edging and watering device to be used adjacent borders of walks or plant beds and refers to an extruded section having a longitudinally extending anchoring leg carried in the earth adjacent the border. There is also provided a substantially flat longitudinally extending mower strip integral with the top part of the vertical leg and an enlarged longitudinally extending body portion projecting above the junction of the anchoring leg and the flat mower strip. A longitudinal bore is provided in the body portion for carrying water therethrough and longitudinally spaced spray heads are carried on the body portion and communicate with the bore. The anchoring leg may have outwardly extending barbs for retention of the anchoring leg within the ground.

While the above-mentioned edging arrangement is useful, it was an essential requirement that the anchoring leg be buried in the ground and this meant that in order to install the edging device of U.S. Pat. No. 3,845,449 it was necessary to dig a trench and accurately locate the mower strip on the top of the ground. Another problem was that the edging device was not versatile and could not be utilized for differing installation requirements. Thus in relation to curved pathways it was necessary to design or provide specially fabricated edging components.

U.S. Pat. No. 3,387,786 refers to a divider assembly for landscaping comprising a plurality of interconnected divider sections wherein each of the sections comprised an extruded length of plastics material including an enlarged upper section defining a central passage. There was also provided an integrally formed downwardly extending flange for substantial insertion in the ground. There was also provided hose coupling means associated with the upper section but the same disadvantage with respect to entrenchment described above in relation to U.S. Pat. No. 3,845,449 also occurred in regard to U.S. Pat. No. 3,387,786.

U.S. Pat. No. 2,954,194 describes a watering arrangement wherein stakes are driven into the ground so as to support a hose carried thereby but this arrangement was somewhat primitive and did not relate to an edging device.

U.S. Pat. No. 2,909,328 teaches irrigation coping for gardens which was laid on top of the ground and retained therein by relatively short downwardly extending spikes. The coping was substantially tubular and carried a relatively large volume of water. There was also provided a conduit in an upper part of the coping which provided suitable hose coupling means. Again this arrangement was not directly suitable for edging purposes because of its inherent lack of stability and its primary function was for irrigation since the base part of the copying combined a plurality of perforations to allow egress of water.

From the summary of the prior art therefore it will be appreciated that it was considered necessary to provide an edging assembly which could be installed in minimum time requiring little ground disturbance and which was relatively lightweight and compact and was simple to manufacture and relatively effective in operation.

SUMMARY OF THE INVENTION

It therefore is an object of the invention to provide an edging assembly which alleviates the disadvantages of the prior art referred to above and which may comply with the aforementioned requirements.

The invention provides an edging assembly which may be used for bordering a lawn, garden strip patio and the like including:

(a) a plurality of elongate supports adapted to be driven in or otherwise retained by a substrate or base surface wherein each support has a pair of outersides, (b) a continuous integral cover strip formed from flexible material having a pair of downwardly extending side flanges each for extending along a respective outer support side and a top conduit having a plurality of spaced water outlets, and (c) releasable attachment means between the each elongate support and the continuous integral cover strip and such that said edging assembly may be installed in the ground by initially embedding said elongate supports at spaced intervals within the ground and subsequently attaching the cover strip to the elongate supports through outward flexing of the side flanges and through the agency of said releasable attachment means wherein the cover strip is supported in a fixed orientation by bearing contact with the plurality of elongate supports.

The pair of downwardly extending side flanges of the cover strip are adapted to conceal upper portions of said elongate supports at ground level. The cover strip may be releasably attachable to the elongate supports in plug-socket or male-female interrelationship. Hose coupling means may also be provided associated with the top conduit.

Each elongate support is suitably provided with a pointed bottom end or shank part adapted to be driven into the ground or other suitable substrate.

Suitably, each elongate support also includes a top portion which functions as a bearing portion and thereby contacts the upper surface of the ground in practice. The top portion with this end in mind is suitably plate-like and oriented in a vertical plane with a bottom edge of the top portion contacting the upper surface of the ground. Preferably the top portion is in the shape of a quadrilateral or substantially in the shape of a rectangle or trapezoid.

The plate-like top portion of each elongate support may be provided with a slot, recess or groove in a top or side edge thereof which may engage with a rib associated with the cover strip and which more suitably depends from the underside of said upper tubular portion.

It will of course be appreciated that the plate-like top portion of each elongate support may include a projection or spigot adapted to be retained within an accommodating groove of the cover strip as an alternative to the arrangement described above. However, in practice the former is preferred.

The cover strip may be formed from resilient or flexible plastics material as a one piece molding or integral plastics strip which can flex outwardly when being positioned over the support top portion and inwardly when it is in place over the support top portion.

If desired, the cover strip may comprise a plurality of cover strip components releasably attached to each other. Again a plug-socket type of inter-engagement between adjacent components may be utilized. The edging assembly may be disassembled by flexing the cover strip outwardly to disengage the slots and ribs.

BRIEF DESCRIPTION OF THE DRAWINGS

Reference may now be made to a preferred embodiment of the invention as shown in the attached drawings wherein:

FIG. 3 is a sectional side view of a plurality of adjacent cover strip components, as shown in FIG. 1, attached to each other;

FIG. 4 is an end view of one type of elongate support for use in the invention;

FIG. 5 is a side view of the elongate support shown in FIG. 4;

FIG. 6 is a bottom plan view of the elongate support shown in FIG. 4;

FIG. 7 is an end view of an alternative type of elongate support to that shown in FIG. 6;

FIG. 8 is a side view of the support shown in FIG. 7;

FIG. 8A is a sectional view of the support shown in FIG. 7 through the line B—B.

FIG. 9 is a perspective view of the edging assembly of the invention showing the cover strip componenst of FIG. 1 supported by the elongate supports shown in FIG. 7;

FIG. 10 is an exploded view showing the interconnection between the elongate support and an adjacent cover strip component;

FIG. 11 is a detailed view of a jet insert used in the top conduit of the cover strip shown in FIG. 10; and FIG. 11A is a sectional view of the jet insert shown in FIG. 10 through line C—C.

DETAILED DESCRIPTION OF THE PREFERRED EMBODIMENT

Figure 2:
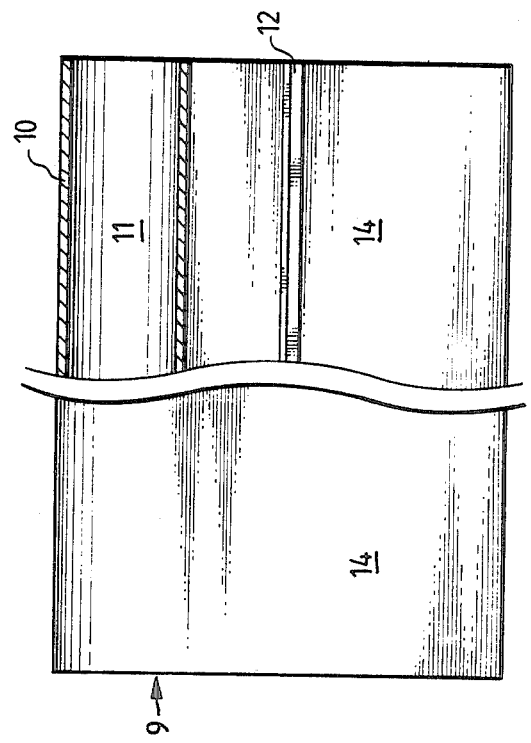
FIG. 2 is a side view of the component through the line A—A, shown in FIG. 1, partly broken away in section.
Figure 1:
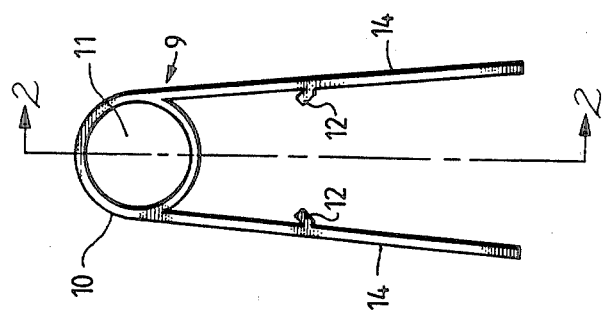
FIG. 1 is an end view of a cover strip component.

The cover strip component 9 of FIGS. 1-2 includes a top portion 10 having a tubular part 11 having a circular or rounded internal bore or surface forming a top conduit. There is also shown downwardly extending side flanges or wings 14 having retaining ribs 12 on a surface of each side flange.

FIG. 3 shows how mutually adjacent cover strip components 9 may be attached to each other by the use of connection means 15 wherein a rippled or corrugated male end 16 may engage with a socket 17 of complementary shape. Male and 16 may function as a water inlet 18 and socket 17 may be closed by an appropriate end plug 19 if desired.

The elongate support 20 shown in FIGS. 4-6 suitably includes a shank part 21 having a pointed end 22 for penetration into the ground. The shank part 21 may be provided with reinforcing ribs 23. The support 20 may also have a head portion in the form of a top housing plate 24 wherein bottom edges 25 contact the upper surface of the ground in use. There is also shown slot or recess 26. There is also shown outer sides or side edges 27.

In the alternative type of elongate support 28 shown in FIGS. 7-8A the shank part 29 is of channel shape having side flanges 29A as shown and includes slot or recess 30. There is also shown bottom edges 25A and recess 28A which assist in location of support 28 within the ground.

In FIG. 9 the tap 32 having hose 33 attached thereto is connected to an edging assembly constructed in accordance with the invention. Hose 33 engages with inlet 18 and adjacent cover strip components 9 are attached to each other as previously described at 34 and 35. Elongate supports 20 support cover strip components 9 wherein inner rib 12 is retained within slot or recess 26, thereby forming releasable attachment means. The tubular part 11 of the cover strip components 9 may be provided with perforations or holes 36 which may optionally be fitted with jets or nozzles (not shown) if desired.

In FIGS. 10-11A the cover strip 9 is shown separated from elongate supports 28 for clarity. There is also shown jet inserts 36A having mounting part 37 which is received in holes 36, internal passage 38, egress aperture 39 located in notch 40 and nut portion 41. Ribs 12 of cover strip component 9 engage in recesses 30 of elongate supports 28 as shown.

The edging assembly of the invention will be found to be simple to manufacture in relation to the cover strip components and elongate supports and extremely effective in operation. It will also be found to be relatively easy to install wherein elongate supports 20 or 28 are placed within the ground and then used to firmly retain the flexible cover strips 9 in place. Because of their flexibility, cover strips 9 may be made to conform to any suitable path which may be straight or arcuate and it will be appreciated that the edging assembly does not require an initial tranch to be dug for installation nor does it have any overhanging parts or lateral parts which require ground surface contact as in the prior art referred to above. The snap fit relationship between elongate supports 20 or 28 and cover strip components 9 also facilitates ease of installation.

The resilient nature of the cover strip can best be considered by noting the procedure for assemblying the edging assembly. When the elongate supports have been imbedded in the ground according to the desired arrangement, the first cover strip is placed over the top portions of the elongate supports. The head portions of the elongate supports, the cover strip and the engagement means are dimensioned such that the side flanges of the cover strip flex outwardly as the cover strip is placed over the head portions of the elongate support. The side flanges are maintained in an outwardly flexed configuration until the head portion extends a sufficient distance between the side flanges of the cover strip. As soon as the engagement means can become engaged, the side flanges will return substantially to their original configuration. The cover strip should be sufficiently flexible and resilient to allow the outward flexing of the side flanges and the return to substantially the original configuration once the engagement means have become engaged. Assembly can occur either by merely pushing the side flanges of the cover strip over the sides of each head portion or by actually holding the side flanges of the cover strip outwardly and then placing the cover strip over the head portion a sufficient distance so that the engagement means can become engaged when the side flanges are released for forming an interference fit relationship between the side flange edges and the side edges of the head portion.

With this arrangement, the edging assembly can be disassembled and relocated. This is done by reversing the process described above so that the engagement means are disenaged by flexing the side flanges outwardly and then removing the cover strip from each head portion. The elongate supports and cover strip may then be relocated or repositioned as desired.

What is claimed is:

1. A flexible edging and sprinkler assembly for gardens capable of following a serpentine path including:
    (a) a plurality of elongate supports adapted to be retained in the ground wherein each support comprises shank and a head portion, said head portion having an opposed pair of spaced-apart side edges, each side edge, having a side edge recess and a taper extending outwardly from top to bottom; and
    (b) a continuous integral cover strip formed from flexible resilient material having:
        (i) a top conduit having a plurality of spaced water outlets; and
        (ii) a pair of side flanges divergingly depending from the top conduit and each having:
            (a) an outwardly extending rib whereby a respective rib is engageable in snap fit relationship with a plurality of said side edge recesses; and
            (b) a taper similar to the taper of the side edges to define, between the side flanges, a recess for receiving support head portions so that the spaced-apart side edges of each head portion face in a direction transverse to the cover strip, each side flange in the pair of side flanges comprising: a side flange surface facing toward the other side flange in the pair and wherein the side flange surfaces extend on respective opposite sides of the head portion, and
        (iii) hose coupling means for coupling a hose to the top conduit.

2. A flexible edging and sprinkler assembly for gardens capable of following a serpentine path including:
    (a) a plurality of elongate supports adapted to be retained in the ground wherein each support comprises a shank and a head portion, said head portion an opposed pair of spaced-apart side edges each side edge having a side edge recess and a taper extending outwardly from top to bottom; and
    (b) a continuous integral cover strip formed from flexible resilient material having:
        (i) a top conduit having plurality of spaced water outlets; and
        (ii) a pair of side flanges divergingly depending from the top conduit and each having:
            (a) an outwardly extending rib whereby the rib is engageable in snap fit relationship with a plurality of said side edge recesses; and
            (b) a taper similar to the taper of the side edges to define, between the side flanges, a recess for receiving the support head portions so that the spaced-apart side edges of each head portion face in a direction transverse to the cover strip, each side flange in the pair of side flanges comprising: a side flange surface facing toward the other side flange in the pair and wherein the side flange surfaces extend on respective opposite sides of the head portion the resiliency of the cover strip causing the flanges to expand outwardly in response to an outward force of the head portion side edges and to contract inwardly upon formation of an interference fit relationship between the flange side edges and the head portion side edges as the cover strip is placed over the transversely extending head portion; and
        (iii) hose coupling means for coupling a hose to the top conduit.

3. The assembly as claim in claim 2, wherein each side edge recess extends toward a center of the elongate support and upwardly toward a top of the elongate support, and wherein, each rib extends upwardly toward the top conduit and toward the other side flange.

4. A flexible edging and sprinkler assembly for gardens capable of following a serpentine path including:
    (a) a plurality of elongate supports adapted to be retained in the ground wherein each support comprises a shank and a substantially trapezoidal head portion, said head portion having an opposed pair of spaced-apart side edges having a taper extending outwardly from top to bottom; and
    (b) a continuous integral cover strip formed from flexible resilient material having:
        (i) a top conduit having plurality of spaced water outlets; and
        (ii) a pair of side flanges divergingly depending from the top conduit having a taper similar to the taper of the side edges to define, between the side flanges a recess for receiving support head portions so that the spaced-apart side edges of each head portion face in a direction transverse to the cover strip, each side flange in the pair comprising a side flange surface facing toward the other side flange in the pair and wherein the side flange surfaces extend on respective opposite sides of the head portion the resiliency of the cover strip causing the flanges to expand outwardly in response to an outward force of the head portion side edges and to contract inwardly upon formation of an interference fit relationship between the flange side edges and the head portion side edges over the transversely extending head portion; and (iii) hose coupling means for coupling a hose to the top conduit.

5. The assembly as claimed in claim 4, wherein each side flange is substantially straight from which a rib extends inwardly from the side flange.

* * * * *

UNITED STATES PATENT AND TRADEMARK OFFICE
CERTIFICATE OF CORRECTION

PATENT NO. : 4,702,034

DATED : October 27, 1987

INVENTOR(S) : Brian D. Ferguson; Phillip B. Jackson

It is certified that error appears in the above-identified patent and that said Letters Patent is hereby corrected as shown below:

| | |
|---|---|
| Col. 1, Line 5 | In the title change "APPLICATIONS" to -- APPLICATION -- |
| Col. 1, Line 16 | Change "specification" to -- Specification --. |
| Col. 2, Line 34 | Change "copying" to --coping--. |
| Col. 3, Line 41 | Change "inter-engagement" to -- interengagement --. |
| Col. 3, Line 66 | Delete the ";" |
| Col. 4, Line 2 | Change "componenst" to -- components -- |
| Col. 4, Line 25 | After "male" change "and" to -- end -- |
| Col. 4, Line 32 | Change "housing" to -- bearing -- |
| Col. 5, Line 4 | Change "tranch" to -- trench -- |

Signed and Sealed this

Thirtieth Day of August, 1988

Attest:

DONALD J. QUIGG

Attesting Officer

Commissioner of Patents and Trademarks